United States Patent
Ulicny

Patent Number: 6,015,142
Date of Patent: Jan. 18, 2000

[54] SPRING MODULE FOR RETURN-TO-NORMAL ACTUATOR

[75] Inventor: Dennis J. Ulicny, Waukesha, Wis.

[73] Assignee: Johnson Controls, Inc., Milwaukee, Wis.

[21] Appl. No.: 08/928,870

[22] Filed: Sep. 12, 1997

[51] Int. Cl.[7] ................................. F16F 1/14; F16F 1/06
[52] U.S. Cl. ............................................. 267/154; 267/155
[58] Field of Search ..................................... 267/154, 155, 267/156, 272; 200/61.85, 61.86

[56] References Cited

U.S. PATENT DOCUMENTS

| | | | |
|---|---|---|---|
| 2,429,313 | 10/1947 | Gilbert | 267/156 |
| 2,941,415 | 6/1960 | Hawkins | 267/156 |
| 3,049,317 | 8/1962 | Kessler | 267/156 |
| 3,120,291 | 2/1964 | Nicholas et al. | 267/156 |
| 4,289,038 | 9/1981 | Hore | 74/2 |

*Primary Examiner*—Robert J. Oberleitner
*Assistant Examiner*—Jeffrey Woller
*Attorney, Agent, or Firm*—Quarles & Brady LLP

[57] ABSTRACT

A spring module having a shaft movable in first and second directions and a biasing element for urging the shaft into a normal position upon loss of power. The spring module also includes motion limiting means for limiting the deenergization of the biasing element and a speed reduction apparatus intercoupling the motion limiting means and the shaft. The biasing element is energized upon movement of the shaft in the second direction and deenergized by shaft movement in the first direction. Similarly, the motion limiting means are coupled to the shaft for movement in third and fourth directions. The speed reduction apparatus moves the motion limiting means at a slower rate in the third and fourth directions than the shaft moves in the first and second directions.

10 Claims, 3 Drawing Sheets

SPRING MODULE FOR RETURN-TO-NORMAL ACTUATOR

BACKGROUND OF THE INVENTION

1. Technical Field

The present invention relates generally to an actuator and, more particularly, to an actuator for positioning a valve or a damper in a fluid distributing system, such as an air conditioning or heating system where the actuator must return the valve or damper to a "home" position when power is lost (return-to-normal).

2. Discussion

In the HVAC industry, dampers and valves are used to control air and fluid movements within systems. The valves and dampers are generally adjusted automatically by actuators. In some applications it is desired that the actuators move the damper or valve to a predetermined position upon the loss of power. One method of accomplishing this "return-to-normal" feature is to include a spring within the actuator that urges the damping or valving element into the predetermined or normal position upon power loss. In such spring returning actuators it is common that the spring is wound when the valve or damper is displaced from its normal position so that when power is lost the spring can unwind and move the actuator output and thereby the damping or valving mechanism into the appropriate position. U.S. Pat. No. 4,741,508 issued May 3, 1988 to Fukamachi entitled "Actuator For Valve" is an example of this type of actuator.

Due to the various applications for dampers and valves within the HVAC industry, certain applications require movement of the valving element in one direction, e.g., toward a closed position, upon the loss of power whereas in other applications the element must be moved in the opposite direction when power is lost, e.g., to a fully open position. Thus, it is desirable that actuators be capable of being set to move the valving or damping element upon loss of power In either of the two directions. The prior art has not adequately addressed this need. Rather, prior art actuators must either be reversed in orientation relative to the valve or damper or the spring element in the actuator must be reversed in orientation to provide operation in the reverse direction. The reversing of the actuator relative to the valve or damper can make accessing the electronic components of the actuator difficult and the reversal of the spring element within the actuator causes unnecessary manual intervention.

In order to insure proper operation of the actuator and damper/valve, it is also important to maintain the spring in a partly wound condition both during normal actuator operation and after the spring has moved the closure element to its home position. The minimum amount of winding is dictated by the force necessary to maintain the closure element in its "home" position during power loss. However, the present invention recognizes that while a stop arrangement could be provided on the spring input or output to limit unwinding, such an arrangement would undesirably limit the travel of the spring and/or the input/output element to less than one reciprocal movement or revolution. To achieve optimum operation of a spring biased return to normal actuator, it is desirable to wind the spring several reciprocations/revolutions between the minimum and maximum winding positions.

SUMMARY OF THE INVENTION

Accordingly, a need exists for an actuator that maintains the spring in a partly wound condition during the operation of the actuator, during power outages, and during the reversal of the operational direction of the actuator that does not limit the movement of the spring winder, or the actuator itself to a single reciprocal movement. The present invention addresses this need by providing a spring module with a speed reduction apparatus having a faster moving element and a slower moving element. A stop coupled for movement with the slower moving element prevents complete unwinding of the spring while allowing multiple turns of travel for the actuator and the spring winding element.

A further need exists for a return-to-normal mechanism for use with actuators that allows the operational direction of the actuator to be reversed without relocating the actuator relative to the valve or damper. The present invention addresses this need by providing a spring module that may be operationally coupled to the actuator for biasing the actuator to a normal position in either a first or second direction. By reversing the orientation of the spring module relative to the actuator rather than the position of the actuator relative to the valve or damper, the actuator remains in a constant orientation relative to the valve or damper thereby, among other benefits, providing ready access to the electronic components of the actuator while the actuator operates in either of the return-to-normal directions.

The present invention provides a spring module for urging a shaft movable in first and second directions into a normal position upon loss of power. The spring module also includes a biasing element, motion limiting means for limiting the deenergization of the biasing element, and a speed reduction apparatus intercoupling the motion limiting means and the shaft. The biasing element is energized upon movement of the shaft in the first direction and deenergized upon movement of the shaft in the second direction. Similarly, the motion limiting means is coupled to the shaft for movement in third and fourth directions. The speed reduction apparatus moves the motion limiting means at a slower rate in the third and fourth directions than the shaft moves in the first and second directions.

BRIEF DESCRIPTION OF THE DRAWINGS

Other objects and advantages of the invention will become apparent upon reading the following detailed description and upon reference to the drawings, in which.

DETAILED DESCRIPTION

This description of the preferred embodiments of the present invention is merely exemplary in nature and is not intended to limit the scope of the claimed invention. Moreover, while this description depicts the invention in an actuator that is designed for use with a damper, valve, or other HVAC flow control components, it is intended to adequately teach one skilled in the art to make and use the spring module disclosed herein in numerous environments where the advantages of the module would be useful.

Figure 1:
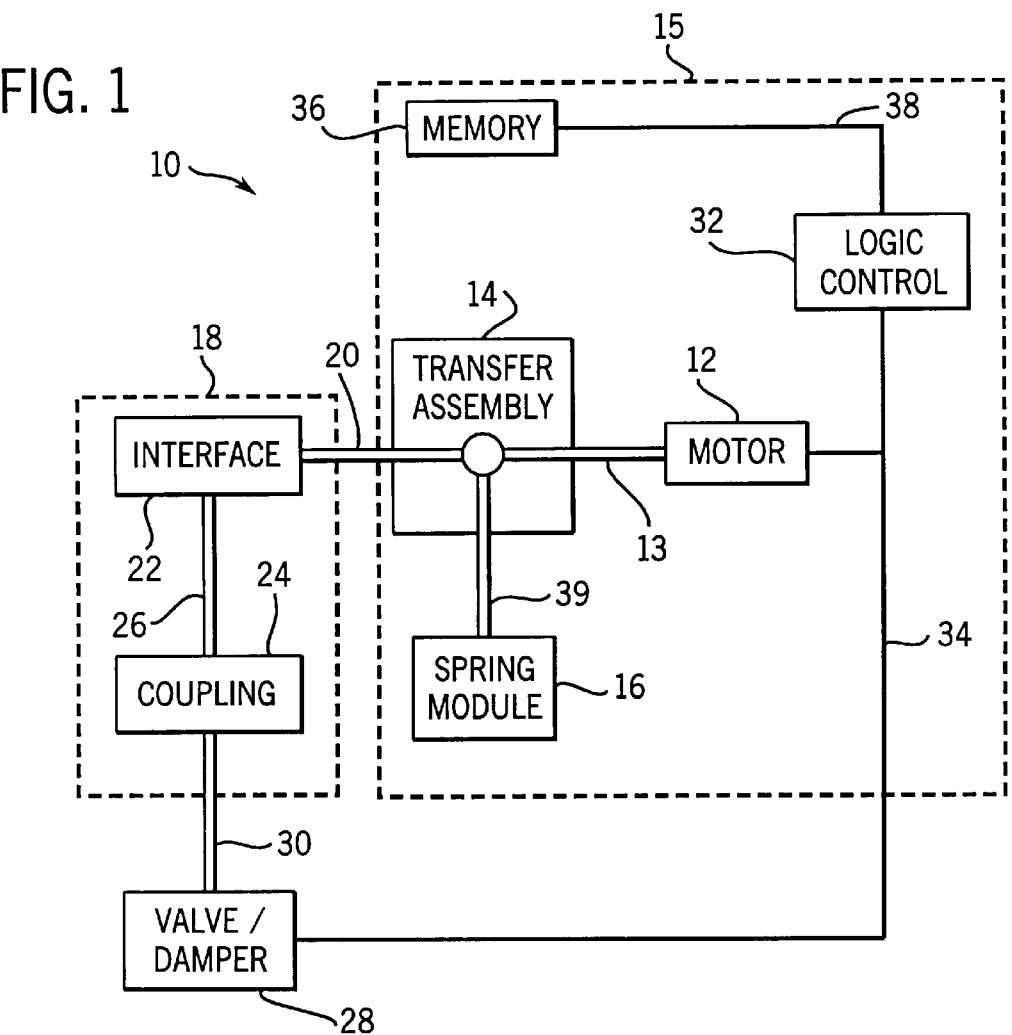
FIG. 1 is a schematic block diagram of an exemplary HVAC component with a spring module according to the present invention.

In FIG. 1, an apparatus 10 is illustrated as including an actuator 15 having a drive motor 12 connected by a drive shaft 13 to a transfer assembly 14. Actuator 15 is connected with a driven member 18 via a driven shaft 20.

For the purposes of this disclosure, the term "shaft" is intended to include any mechanical coupling such as a solid or hollow shaft, a flexible coupling, a gear train, or the like.

Driven member 18 includes an interface 22 to which driven shaft 20 is coupled, and a coupling 24 which is connected with interface 22 via a shaft 26. It will be appreciated that it is customary to include a gear reduction between motor 12 and coupling 24 in order to slow the speed of and amplify the torque generated by the motor. Driven member 18 is connected with an actuated device 28, such as a valve or damper, by an actuating shaft 30. A logic/control device 32 is coupled via a network 34 with drive motor 12, spring module 16 and may also be coupled with actuated device 28. A memory 36 is coupled with logic/control device 32 via a line 38.

Spring module 16 is operationally coupled to transfer assembly 14 such as by shaft 39. Those skilled in the art will appreciate that, notwithstanding the following detailed description of a preferred embodiment of the present invention, various components may be added or coupled to actuator 15 such as to spring module 16 via appropriate shafts or other couplers without departing from the scope of the invention as defined by the appended claims. For example, various brakes, clutches, gears, and shafts may be used such as to translate the rotational movements described herein into continuous or intermittent linear displacement of selected components of the assembly that are either shown and described herein or generally known to those skilled in the art.

Figure 2:
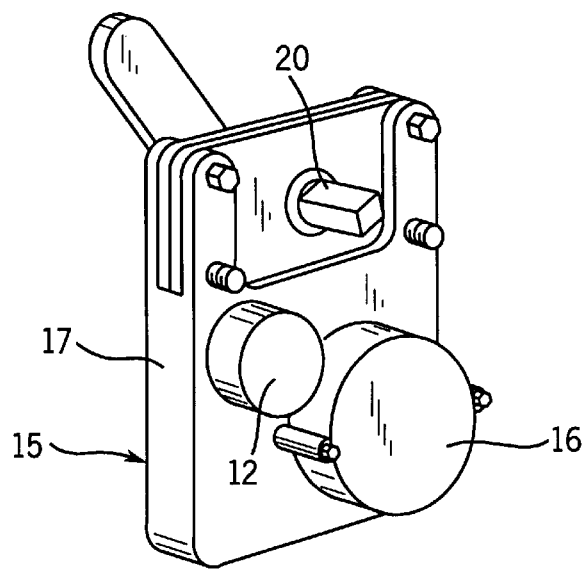
FIG. 2 is a perspective view of an actuator having a spring module according to the present invention.

An exemplary actuator 15 is illustrated in FIG. 2 for discussion purposes. It will be appreciated that a variety of actuators known in the art other than that illustrated in FIG. 2 may be used with the present invention without departing from the scope thereof as defined by the appended claims. Actuator 15 is illustrated to include a housing 17 to which a spring module 16 and drive motor 12 are coupled. The operational components of the drive motor 12 and spring module 16 as discussed herein are operationally coupled to the components of the actuator in a manner generally known in the art. Actuator 15 includes a driven shaft 20 such as that described above and illustrated in FIG. 1 for coupling to an HVAC component such as valve/damper 28 (FIG. 1) via driven member 18.

Figure 3:
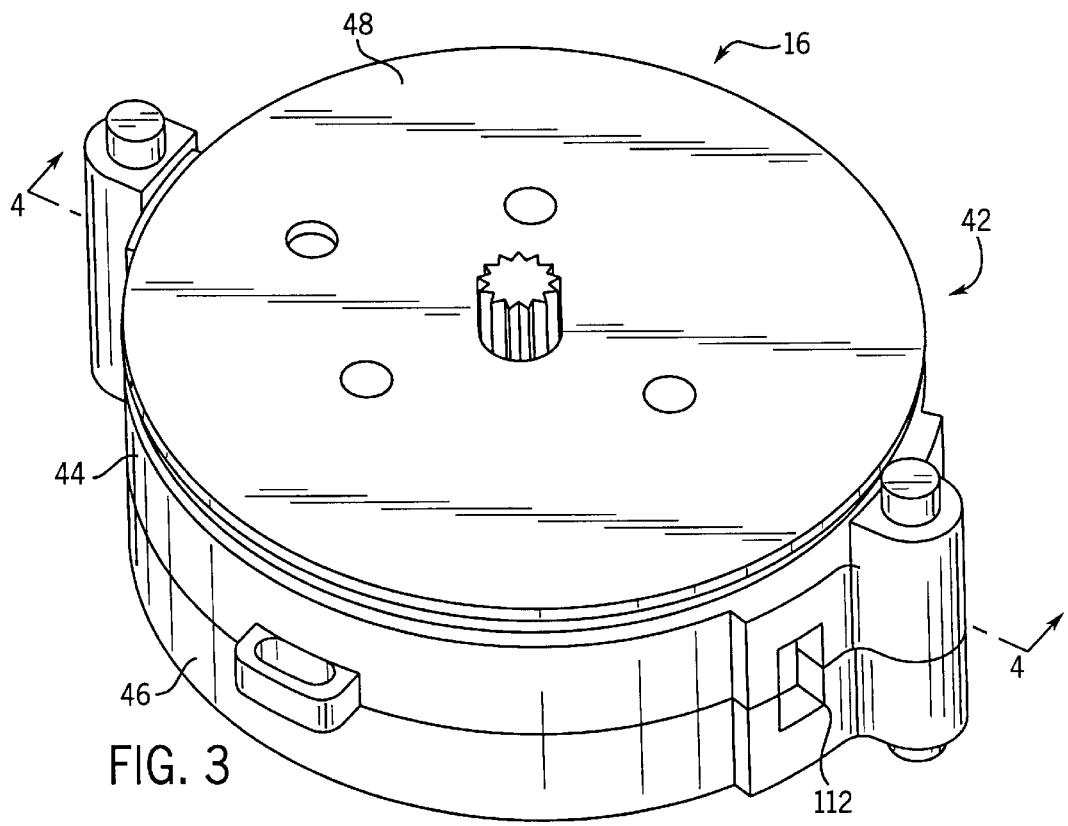
FIG. 3 is a perspective view of a spring module according to the present invention.
Figure 4:
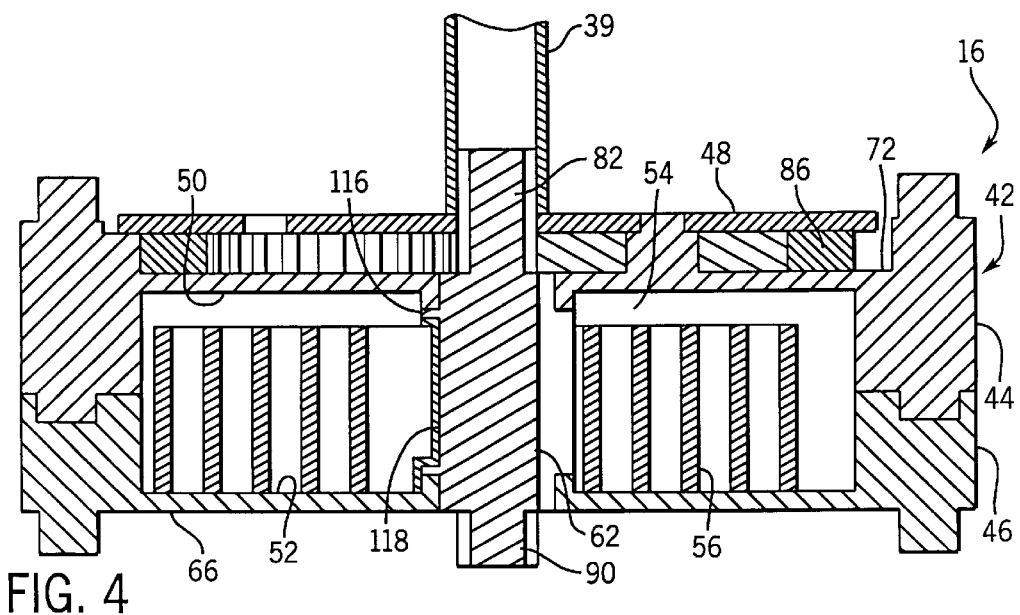
FIG. 4 is a cross-sectional view of the spring module shown in FIG. 3.
Figure 5:
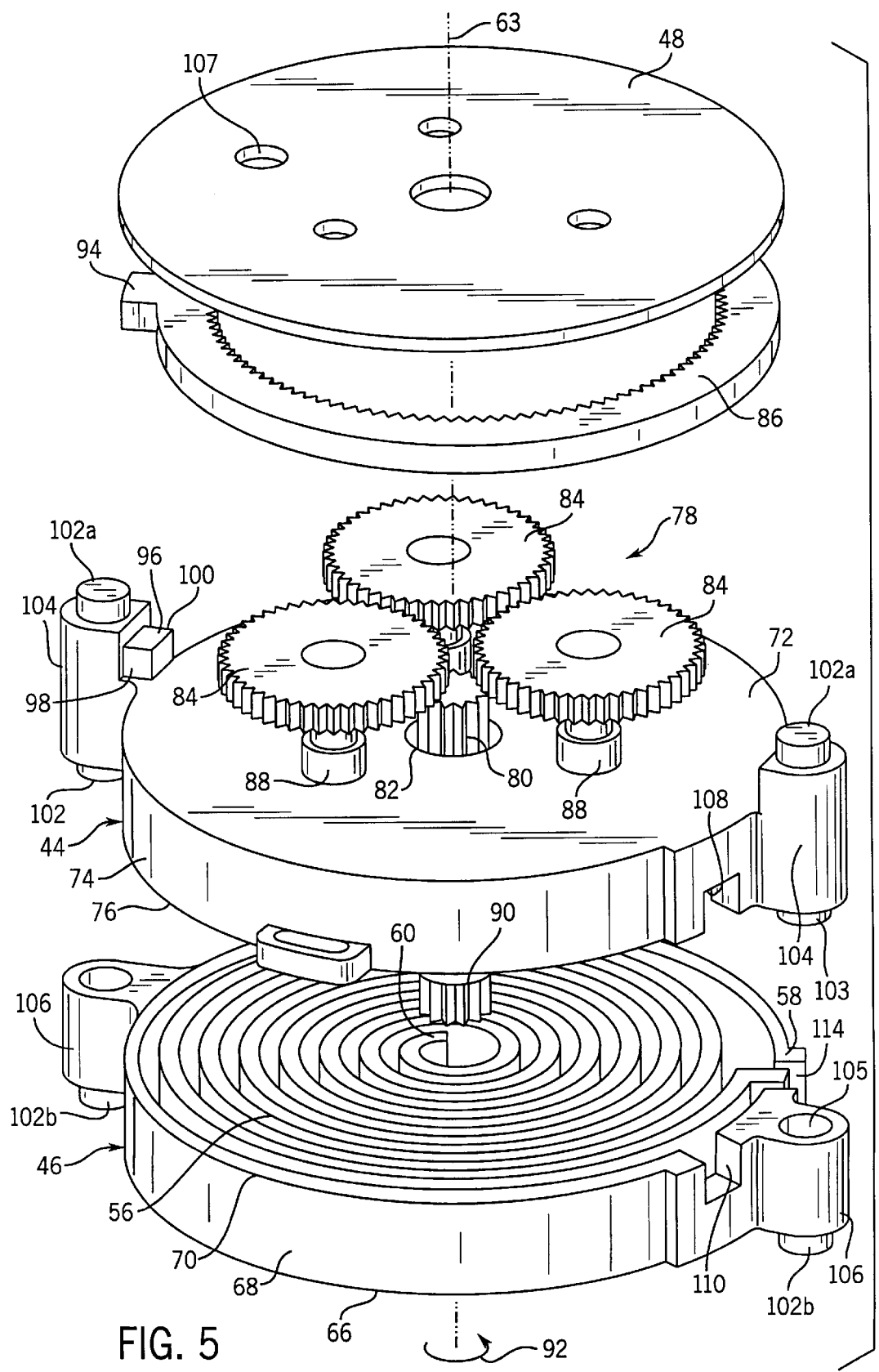
FIG. 5 is an exploded perspective view of the spring module shown in FIG. 3.

With reference to FIGS. 3–5, spring module 16 is illustrated to include a housing 42 that includes an upper housing segment 44, a lower housing segment 46, and a cover 48. Upper and lower housing segments 44 and 46 are configured for cooperative engagement with one another and each segment includes spring recesses 50 and 52, respectively, that define a spring cavity 54 accommodating a biasing element such as clock spring 56 (FIG. 4). As best illustrated in FIG. 5, clock spring 56 includes a first end 58 that is substantially fixed relative to housing 42 in a manner hereinafter described and a second end 60 coupled for rotation with a shaft 62 (FIG. 4) in a manner generally known in the art such as by disposal in a slot formed in shaft 62 as described in U.S. Pat. No. 4,741,508 to Fukamachi, the disclosure of which is incorporated herein by reference. It will also be understood that while a clock or coil spring is illustrated in the drawings and described in detail herein, other spring or biasing mechanisms known in the art may be substituted for the clock spring in a manner generally recognized by those skilled in the art. For example, the present invention could include a torsion spring.

With continued reference to FIG. 5, upper and lower housing segments 44 and 46 are generally cylindrical in shape about an axis 63. Lower housing segment 46 is illustrated to include a lower planar surface 66 from which a ring 68 extends upwardly terminating at a radial engagement surface 70. Likewise, an upper planar surface 72 of upper housing segment 44 has a cylindrical ring wall 74 extending axially downwardly therefrom and terminating at a radial engagement surface 76. Those skilled in the art will appreciate that upper and lower housing segments 44 and 46 are engageable as shown in FIG. 3 to generally define a substantially enclosed cylinder.

As best illustrated in FIG. 5, spring module 16 further includes a motion reduction apparatus such as a planetary gear set 78 having a sun gear 80 defined by a splined portion of shaft 62 proximate to a first end 82 thereof. The gear set 78 further includes a plurality of planetary gears 84 and a ring gear 86. Planetary gears 84 are coupled to upper housing 44 for rotation relative thereto such as by spindles 88. As is generally known in the art, the illustrated planetary gear set 78 transfers rotational forces from sun gear 80 to ring gear 86 via planetary gears 84 such that ring gear 86 rotates about axis 63 at an angular speed that is less than the rotation of sun gear 80 (i.e., shaft 62). More particularly, the relative speed of rotation of ring gear 86 and sun gear 80 is dependent upon the number of teeth on sun gear 80 and ring gear 86.

As generally discussed above, a second end 60 of spring 56 is fixed for rotation with shaft 62. Accordingly, rotation of shaft 62 in a first direction generally indicated by arrow 92 causes unwinding of spring 56. Conversely, rotation of shaft 62 in a second direction opposite arrow 92 winds spring 56.

While those skilled in the art will appreciate that a variety of methods known in the art may be used to secure second end 58 of spring 56 to housing 42, in the embodiment illustrated in FIGS. 3–5 upper and lower housing members 44 and 46 each include rectangular shaped recesses 108 and 110 extending away from radial engagement surfaces 46 and 40 thereof, respectively. Recesses 108 and 110 cooperate to define notch 112 (FIG. 3) for retaining second end 58 of spring 56. In the preferred embodiment, a similarly configured second notch 114 (FIG. 5) is formed by housing 42.

As best illustrated in FIG. 4, the preferred embodiment of shaft 62 also includes a radially extending stepped tab 116 that defines a notch 118 for accommodating first end 60 of spring 56 thereby coupling first spring end 60 for rotation with shaft 62. A variety of alternative arrangements for coupling first and second ends 58 and 60 of spring 56 to housing 42 and shaft 62 will be apparent to those skilled in the art and may be used without departing from the scope of the invention as defined by the appended claims.

Those skilled in the art will appreciate that the splined portions of shaft 62 proximate to first and second ends 82 and 90 thereof, respectively, provide mechanical output from spring module 16. One of the first and second ends 82 and 90 of spring module 16 may be operationally coupled to an appropriately configured element on actuator 15 such as by shaft 39 (FIG. 1) whereby the biasing features of spring module 16 are conveyed to the transfer assembly 14 of the actuator. By selectively coupling one of first and second ends 82 and 90 to transfer assembly 14, spring module 16 provides a return-to-normal feature to the actuator in either a first or second direction without reorienting the actuator relative to the damper or valve.

More particularly, spring module 16 may be reversed in its direction of operation simply by flipping the housing upside down or, stated differently, opposite the orientation illustrated in FIG. 4. More particularly, while spring module 16 is illustrated in FIG. 4 as having first end 82 of shaft 62 coupled to transfer assembly 14 via shaft 39 and second end 90 of shaft 62 rotating freely in space, spring module 16 is operative in the opposite direction wherein second end 90 of shaft 62 is coupled to shaft 39. This reversibility allows spring module 16 to operate valves and dampers that are normally opened or normally closed by movement of driven shaft 20 in either of the rotational directions illustrated.

To accommodate the above reversible operation, spring module 16 includes a pair of opposed mounting members 104 on the periphery of upper housing member 44 and mounting members 106 on the periphery of lower housing member 46. As best illustrated in FIG. 4, upper mounting members 104 have upwardly and downwardly projecting cylindrically shaped pins 102a and 103, respectively. Lower mounting members 106 include a downwardly projecting recess 105 configured to cooperate with pin 103 to secure upper and lower housing members 44 and 46 to one another. Lower mounting member 106 further includes a downwardly extending pin 102b. Those skilled in the art will appreciate that pins 102a and 102b are each configured to engage an appropriately configured hole on the actuator housing 17 to couple spring module 16 thereto (FIG. 2). By this arrangement, spring module 16 may be coupled to the actuator with either first or second end 82 or 90 of shaft 62 coupled to the transfer assembly 14 whereby the return-to-normal feature may operate in either direction, e.g. to open or close the valve or damper, without repositioning the actuator on the valve or damper as described above.

In order to indicate the position of the spring module relative to the actuator, an inspection hole 107 is provided on cover 48. Those skilled in the art will appreciate that the position of hole 107 relative to a sensing element on the actuator allows the actuator electronics to know the position of the spring module and thereby the direction of operation for the return-to-normal feature. To distinguish the alternative orientation of the spring module, no inspection hole is provided on the lower planar surface 66 of lower housing member 46.

Turning now to the motion limiting feature of the present invention, ring gear 86 is illustrated in FIGS. 4 and 5 to include a tab 94 extending radially outwardly therefrom to cooperate with a stop 96 integral with upper housing member 44. When spring module 16 is completely assembled as illustrated in FIGS. 3 and 4, ring gear 86 (FIG. 4) is supported by upper planar surface 72 of upper housing member 44 for rotation thereupon. In this arrangement, ring gear 86 is rotatable in the direction of arrow 92 about axis 63 (FIG. 5) between a first position wherein tab 94 abuts a first vertical face 98 of stop 96 and a second position wherein tab 94 engages an opposite vertical face 100 of stop 96. By this arrangement, the rotation of ring gear 86 is limited to slightly less than one full revolution about axis 63 either in the direction of, or the direction opposite to, arrow 92. Those skilled in the art will appreciate that shaft 62 and corresponding sun gear 80 rotate through numerous revolutions before ring gear 86 rotates through its slightly less than one full revolution. Thus, spring 56 is maintained in a partially wound state during the operation of spring module 16 by stopping ring gear 86 at its first position without correspondingly limiting the rotation of the shaft 62 to a single revolution.

Planetary gears 84 transfer rotational movement of shaft 62 to ring gear 86 in the manner heretofore described and generally known in the art. Thus, upon rotation of shaft 62 about its axis 63 in the direction opposite arrow 92, planetary gears 84 transfer rotational movement to ring gear 86 thereby moving the ring gear in a direction of arrow 92. Likewise, rotation of shaft 62 in a direction of arrow 92 causes angular movement of ring gear 86 in the direction opposite arrow 92.

It will also be appreciated that the present invention is intended for use with an electrically powered driver such as drive motor 12 that acts upon shaft 62 via transfer assembly 14 and shaft 39. When power is lost, the biasing force developed by spring 56 urges shaft 62 to rotate in the direction of arrow 92 thereby causing actuator 15 to move driven shaft 20 to a predetermined position corresponding to an open or closed position for damper or valve 28 (FIG. 1). Upon loss of power, shaft 62 rotates in the direction of arrow 92 thereby urging ring gear 86 to rotate in the direction opposite arrow 92 until tab 94 abuts vertical face 98 of stop 96. Typically, in return-to-normal actuators, the motor is disengaged from the rest of the actuator upon loss of power so that the motor does not add drag which could prevent the spring from exerting the proper amount of force to return the damper or valve to its home position. The gear teeth formed on first and second ends 82 and 90 of shaft 62, planetary gear 84 and ring gear 86 are configured such that the driven member is urged into its predetermined position while spring 56 is maintained in a partially wound state.

The following description of a particular embodiment of the present invention with respect to the number of winds upon spring 56 and the corresponding movement of shaft 62 is presented for completeness and is not intended to unduly limit the scope of the invention defined by the appended claims. One embodiment of the invention may include a spring that requires six winds to maintain proper force on the damper or valve in the normal position and fourteen winds on the spring to achieve a fully wound state. Thus, during normal operation in this embodiment, the winds on the spring vary between six and fourteen. In order to always keep at least six winds on the spring, while allowing movement between six and fourteen winds, a planetary gear set with gear ratios of about ten to one (10:1) is required. Thus, the ring gear 86 in this arrangement will travel slightly less than one turn while the spring 56 and shaft 62 move between six and fourteen turns. The above-described stop is fixed to the housing to engage the ring gear 86 or an equivalent component to limit spring unwinding such that at least six winds are maintained on the spring at all times.

To provide the above-discussed magnitudes of relative movement between the ring gear 86 and shaft 62, the sun gear is provided with twelve teeth, each of the three planetary gears have forty-eight teeth, and the ring gear has one hundred and eleven teeth. This gear configuration gives a reduction of 9.25 to 1. When constructed, the spring is first wound six turns, then the gears are assembled with tab 94 resting against vertical face 98 of stop 96. In this configuration, the ring gear moves only 0.86 turns upon movement of the spring via shaft 62 through its eight turns. Thus, the spring cannot be unwound to less than six turns while providing a full range of operation between six and fourteen turns. Those skilled in the art will appreciate that a further planetary gear set or other motion reduction apparatus may be provided to allow relative movement of the spring 56 and shaft 62.

From the above description as well as the appended claims and drawings, those skilled in the art will recognize that the motion limiting arrangement provided by tab 94 and stop 96 as well as the planetary gear assembly 78 provides a unique arrangement for insuring a minimum biasing force exerted by spring 56 while allowing flexibility in the range of movement of the drive shaft and driven member. This benefit, in combination with the ability to easily re-orient spring module 16 relative to the driver or driven shaft in order to change the direction of operation thereof, provides operational flexibility allowing the spring module to be used in a variety of conditions.

Various other advantages of the present invention will become apparent to those skilled in the art after having the benefit of studying the foregoing text and the appended drawings, taken in combination with the following claims.

What is claimed is:

1. A spring module for an actuator, said spring module comprising:

a housing;

a shaft being movable in a first direction and a second direction opposite said first direction;

a biasing element coupled to said shaft for urging said shaft in said first direction, said biasing element being energized upon movement of said shaft in said second direction and de-energized upon movement of said shaft in said first direction; and motion limiter that limits de-energization of said biasing element; and a speed reduction apparatus intercoupling said motion limiter and said shaft to move said motion limiter in a third direction upon movement of said shaft in said second direction and a fourth direction opposite said third direction upon movement of said shaft in said first direction, said motion limiter moving at a slower rate in said third and fourth directions than said shaft moves in said first and second directions, said speed reduction apparatus including a planetary gear assembly having a sun gear defined by said shaft, a planet gear, and a ring gear each coupled to said housing for rotation about an axis, said ring gear having a tab extending radially from said axis, said housing further including a stop engageable with said tab to define said motion limiter and to limit movement of said ring gear relative to said housing to less than one revolution about said axis.

2. The spring module of claim 1 further including a stop coupled to said housing, and wherein said shaft is coupled to said housing for movement relative thereto and said motion limiter includes a tab engageable with said stop to limit the de-energization of said biasing element.

3. The spring module of claim 1 wherein said shaft is coupled to said housing for rotation in a clockwise and a counter-clockwise direction relative to said axis, said first direction defined by one of said clockwise and counter-clockwise rotation of said shaft, said second direction defined by the other of said clockwise and counter-clockwise rotation of said shaft, said planet gears rotationally coupling said ring gear to said sun gear whereby movement of said shaft in said first direction causes rotation of said ring gear about said axis in said fourth direction and rotation of said shaft in said second direction causes movement of said ring gear about said axis in said third direction.

4. The spring module of claim 1 wherein said biasing means is a spring having a first end and a second end, said first end of said spring being coupled to said housing and said second end of said spring being connected to said shaft whereby said spring is wound by rotating said shaft in said second direction.

5. A spring module for an actuator, said spring module comprising:

a shaft being movable in a first direction and a second direction opposite said first direction;

a housing to which said shaft is coupled for movement relative thereto and having a mounting mechanism to selectively secure said spring module to the actuator in one of a first position wherein said first end of said shaft is coupled to the actuator and a second position wherein said second end of said shaft is coupled to the actuator;

a biasing element coupled to said shaft for urging said shaft in said first direction, said biasing element being energized upon movement of said shaft in said second direction and de-energized upon movement of said shaft in said first direction; and motion limiter to limit de-energization of said biasing element; and a speed reduction apparatus intercoupling said motion limiter and said shaft to move said motion limiter in a third direction upon movement of said shaft in said second direction and a fourth direction opposite said third direction upon movement of said shaft in said first direction, said motion limiter moving at a slower rate in said third and fourth directions than said shaft moves in said first and second directions.

6. The spring module of claim 5 wherein said mounting means includes first pins extending upwardly from said housing and second pins downwardly from said housing.

7. A spring module comprising:

a housing;

a shaft coupled to said housing for rotation between a first position and a second position;

a spring having a first end coupled to said housing and a second end coupled to said shaft, said spring being energized by rotation of said shaft toward said first position and de-energized by rotation of said shaft toward said second position, said spring urging said shaft toward said second position;

a speed reduction apparatus coupled to said shaft such that said shaft rotates more than one revolution when travelling from said first position to said second position, said speed reduction apparatus includes a planetary gear assembly having a ring gear and planet gears, said planet gears coupling said ring gear to said shaft whereby said ring gear moves at a slower rotational speed than said shaft; and motion limiter coupled to said shaft by said speed reduction apparatus and limiting movement of said shaft to a range of travel between said first and second positions, and including a tab extending radially from said ring gear and a stop coupled to said housing, said tab engaging a first side of said stop when said shaft is in said first position and a second side of said stop when said shaft is in said second position.

8. The spring module of claim 7 wherein said spring exerts a minimum biasing force upon said shaft to urge said shaft in said second direction when said shaft is in said second position.

9. The spring module of claim 7 wherein said housing includes an upper housing segment having an upper spring recess and a lower housing segment defining a lower spring recess, said upper and lower housings being engageable such that said upper and lower spring recesses cooperate to define a spring cavity, said spring disposed within said spring cavity.

10. The spring module of claim 9 wherein said upper housing segment defines an engagement face having a notch extending axially upwardly therefrom, said lower housing segment defining a radial engagement surface having a notch extending downwardly therefrom, said notches cooperating to define a slot communicating with said spring cavity upon engagement of said upper and lower housing segments, and said first end of said spring disposed in said slot to engage said housing and restrict movement of said first end of said spring.

* * * * *